United States Patent Office
3,431,232
Patented Mar. 4, 1969

3,431,232
PIPERIDINE N-OXIDE POLYOLEFIN STABILIZERS
Keisuke Murayama, Toshimasa Toda, Saburo Akagi, Tomoyuki Kurumada, and Ichiro Watanabe, Tokyo, and Atsushi Kitaoka, Nobeoka, Japan, assignors to Sankyo Company Limited, Tokyo, Japan, and Asahi Kasei Kogyo Kabushiki Kaisha, Osaka, Japan
No Drawing. Filed Nov. 25, 1966, Ser. No. 596,796
Claims priority, application Japan, Nov. 26, 1965, 40/72,645
U.S. Cl. 260—45.8       6 Claims
Int. Cl. C08f 51/60; C07d 29/12

ABSTRACT OF THE DISCLOSURE

Polyolefins are stabilized against deterioration resulting from exposure to light with piperidine N oxides.

---

This invention relates to the stabilization of polyolefin. More particularly, it relates to the stabilization of polyolefin against deterioration resulting from exposure to light with piperidine N-oxides. Still more particularly, it is concerned with the stabilization of polyolefin against such photo-deterioration with a piperidine N-oxide having the formula

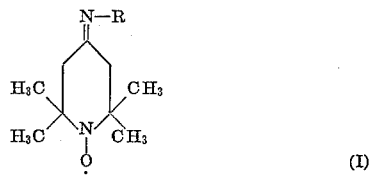

wherein R represents alkyl group, cycloalkyl group, aryl group, alkaryl group, ureido group, thioureido group, anilino group, alkyl-substituted anilino group, the group

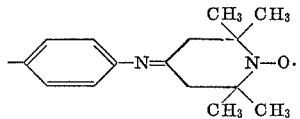

or the group

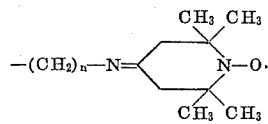

in which $n$ is an integer of 1–8 inclusive.

Polyolefins are frequently subjected to photo-deterioration when exposed to light such as sunlight or ultraviolet light. For the purpose of stabilizing polyolefins against such deterioration, there have been provided in the art a great number of light stabilizers, especially such light stabilizers as "Tinuvin P" (the trade name of the light stabilizer containing as active ingredient 2-(2'-hydroxy - 5' - methyl) - phenylbenzotriazole; and 2,4 - dihydroxybenzophenone. These prior art stabilizers are, however, not satisfactorily effective in the imbibition of deterioration of the polyolefin, especially when employed under the outdoor exposure to sunlight. Thus, the appearance of the more effective stabilizers is highly desired in the art.

As a result of our investigations on light stabilizers, it has now been found that the above-mentioned piperidine N-oxides (I) exhibit excellent light stability against deterioration of polyolefin, little thermal sublimation and no coloring or discoloring action on polyolefin.

It is, therefore, an object of this invention to provide newly found stabilizers for polyolefins against deterioration resulting from exposure to light.

It is, another object of this invention to provide polyolefins stabilized against deterioration under the action of light with the above-mentioned piperidine N-oxides (I).

It is other object of this invention to provide an improved process for stabilizing polyolefins against deterioration by light which comprises incorporation of the above-mentioned piperidine N-oxides (I) into the polyolefins.

Other objects will appear in the more detailed description of this invention which follows.

The term "polyolefin" as used herein is intended to include high and low pressure polyethylenes, polypropylene, other polyolefins, for example, polybutadiene, polyisoprene and the like and various olefin copolymers, for example, ethylene-propylene copolymers, styrene-butadiene copolymers, acrylonitrile-butadiene-styrene copolymers and the like.

The aforesaid piperidine N-oxides (I) employed in this invention are novel compounds with exception of 2,2,6,6-tetramethyl-4-ureido-iminopiperidine-1-oxide. Novel piperidine N-oxides may be readily and advantageously prepared by utilizing those procedures commonly employed in the art, for instance, by reacting the corresponding 4-piperidones or 2,2,6,6-tetramethyl-4-oxopiperidine-1-oxides with the corresponding amines.

In the definition of the substituent R in the above Formula I, typical alkyl groups are methyl, ethyl, propyl, butyl and octyl groups. Typical cycloalkyl groups are cyclopentyl and cyclohexyl groups. Typical aryl groups are phenyl and naphthyl groups. Typical alkaryl groups are o-, m- and p-tolyl and dodecylphenyl groups. Typical alkyl-substituted anilino groups are o-, m- and p-methyl and ethyl anilino groups.

Representative examples of the piperidine N-oxides (I) employed in this invention include the following:

2,2,6,6-tetramethyl-4-n-butylimino-piperidine-1-oxide;
2,2,6,6-tetramethyl-4-cyclohexylimino-piperidine-1-oxide;
2,2,6,6-tetramethyl-4-β-naphthyl-iminopiperidine-1-oxide;
2,2,6,6-tetramethyl-4-ureidoimino-piperidine-1-oxide;
2,2,6,6-tetramethyl-4-thioureido-iminopiperidine-1-oxide;
2,2,6,6-tetramethyl-4-(p-tolyl-imino) piperidine-1-oxide;
2,2,6,6-tetramethyl-4-(p-dodecyl-phenylimino) piperidine-1-oxide;
2,2,6,6-tetramethyl-4-(p-tolyl-hydrazino) piperidine-1-oxide;
N,N'-bis(2,2,6,6-tetramethyl-4-piperidylidene-1-oxide) ethylenediamine;
N,N'-bis(2,2,6,6-tetramethyl-4-piperidylidene-1-oxide) hexamethylene-diamine; and
N,N'-bis(2,2,6,6-tetramethyl-4-piperidylidene-1-oxide) p-phenylene-diamine.

Where the piperidine N-oxides of the above-mentioned Formula I are to be employed in polyolefin for the purpose of stabilization, they may be incorporated or blended into polyolefin by any of the conventional methods commonly used for incorporating or blending commercially available stabilizers such as antioxidants into the polyolefin, for instance, by incorporating the piperidine N-oxide into the polyolefin at any desired stage prior to the preparation of shaped articles.

The amount of the piperidine N-oxide to be employed in the polyolefin in accordance with this invention can be widely varied, depending upon the properties and particular use of the stabilized polyolefin and other factors, but generally it is preferred to employ the piperidine N-oxide (I) in the range of concentrations of about 0.05–2% by weight, most preferably concentrations of about 0.1–1% by weight, the concentration being based upon the weight of the polyolefin.

Other additives commonly used in the art, including other known antioxidants and ultraviolet absorbants, may be optionally utilized together with the piperidine N-oxides (I). If necessary, an optional combination of two or more piperidine N-oxides may be satisfactorily employed in this invention in order to achieve the better results.

The following nonlimiting examples are given only for the purpose of illustrating the excellent light resistance of the piperidine N-oxides (I) in the polyolefin in accordance with this invention.

All parts are given by weight unless otherwise indicated.

Example

With 100 parts of polypropylene was uniformly admixed 0.25 part of the stabilizer indicated hereinbelow.

The mixture was melted by heating and molded into a sheet of 0.5 mm. thick.

The polypropylene sheet thus produced and, as a control, that containing no stabilizer for comparative purposes were tested with ultraviolet irradiation at a temperature of 45° C. by means of the fademeter prescribed in the JIS–L–1044-3-8.

The time until the test sheet will become brittle, hereinafter referred to as "brittle time," was measured.

The results are listed in the following table.

TABLE

| Stabilizer (this invention): | Brittle time (hrs.) |
|---|---|
| 2,2,6,6 - tetramethyl - 4 - n - butyliminopiperidine-1-oxide | 300 |
| 2,2,6,6-tetramethyl - 4 - cyclohexyliminopiperidine-1-oxide | 300 |
| 2,2,6,6 - tetramethyl - 4 - ureidoiminopiperidine - 1-oxide | 300 |
| 2,2,6,6 - tetramethyl - 4 - (p - tolylimino) piperidine-1-oxide | 140 |
| 2,2,6,6 - tetramethyl - 4 - (p - tolylhydrazono) piperidine-1-oxide | 200 |
| N,N' - bis(2,2,6,6 - tetramethyl - 4 - piperidylidene-1-oxide) ethylenediamine | 220 |
| N,N' - bis(2,2,6,6 - tetramethyl - 4 - piperidylidene-1-oxide) hexamethylenediamine | 260 |
| N,N' - bis(2,2,6,6 - tetramethyl - 4 - piperidylidene-1-oxide) p-phenylenediamine | 140 |
| Commercially available: | |
| "Tinuvin P" | 80 |
| 2,4-dihydroxybenzophenone | 100 |
| Control: None | 40 |

Likewise, the general procedure for preparing and testing a polymer sheet as disclosed above was repeated except that an equal amount of polyethylene was employed instead of polypropylene. There were obtained similar results in "brittle time" to those in the above table.

From the foregoing results it will be apparent that the piperidine N-oxides of the above Formula I exhibit a superior stabilizing effect with respect to reducing the deterioration of the polyolefin, particularly polypropylene and polyethylene, by light, as compared with known light stabilizers.

What is claimed is:
1. Polyolefin stabilized against deterioration by light wherein there is incorporated a sufficient amount to inhibit the deterioration of a compound having the formula

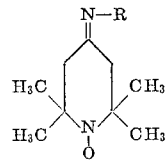

wherein R represents alkyl group, cycloalkyl group, aryl group, alkaryl group, ureido group, thioureido group, anilino group, alkyl-substituted anilino group, the group

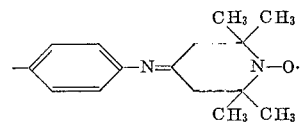

or the group

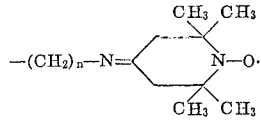

in which $n$ is an integer of 1–8 inclusive, said polyolefin being a homopolymer of mono-alpha-olefin or a copolymer of mono-alpha-olefin with other ethylenically unsaturated monomers.

2. Polyolefin stabilized against deterioration by light wherein there is incorporated an amount of 0.05–2% by weight of a compound selected from the group consisting of 2,2,6,6-tetramethyl-4-n-butyliminopiperidine-1-oxide;
2,2,6,6-tetramethyl-4-cyclohexyliminopiperidine-1-oxide;
2,2,6,6-tetramethyl-4-ureidoiminopiperidine-1-oxide;
2,2,6,6-tetramethyl-4-(p-tolylimino)-piperidine-1-oxide;
2,2,6,6-tetramethyl-4-(p-tolylhydrazono)-piperidine-1-oxide;
N,N'-bis(2,2,6,6-tetramethyl-4-piperidylidene-1-oxide) ethylenediamine;
N,N'-bis(2,2,6,6-tetramethyl-4-piperidylidene-1-oxide) hexamethylenediamine; and
N,N'-bis(2,2,6,6-tetramethyl-4-piperidylidene-1-oxide) p-phenylenediamine, said polyolefin being a homopolymer of mono-alpha-olefin or a copolymer of mono-alpha-olefin with other ethylenically unsaturated monomers.

3. Polypropylene stabilized against deterioration by light wherein there is incorporated a sufficient amount to inhibit the deterioration of a compound having the formula

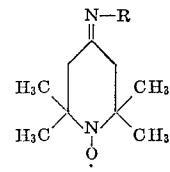

wherein R represents alkyl group, cycloalkyl group, aryl group, alkaryl group, ureido group, thioureido group, anilino group, alkyl-substituted anilino group, the group

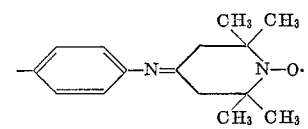

or the group

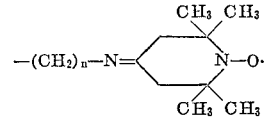

in which $n$ is an integer of 1–8 inclusive.

4. Polypropylene stabilized against deterioration by light wherein there is incorporated an amount of 0.05–2% by weight of a compound selected from the group consisting of 2,2,6,6-tetramethyl-4-n-butylimino-piperidine-1- oxide;

2,2,6,6-tetramethyl-4-cyclohexylimino-piperidine-1-oxide;
2,2,6,6-tetramethyl-4-ureidoimino-piperidine-1-oxide;
2,2,6,6-tetramethyl-4-(p-tolylimino)-piperidine-1-oxide;
2,2,6-6-tetramethyl-4-(p-tolylhydrazono)-piperidine-1-oxide;
N,N'-bis(2,2,6,6-tetramethyl-4-piperidylidene-1-oxide) ethylenediamine;
N,N'-bis(2,2,6,6-tetramethyl-4-piperidylidene-1-oxide) hexamethylenediamine; and
N,N'-bis(2,2,6,6-tetramethyl-4-piperidylidene-1-oxide) p-phenylenediamine.

5. Polyethylene stabilized against deterioration by light wherein there is incorporated a sufficient amount to inhibit the deterioration of a compound having the formula

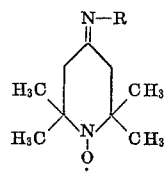

wherein R represents alkyl group, cycloalkyl group, aryl group, alkaryl group, ureido group, thioureido group, anilino group, alkyl-substituted anilino group, the group

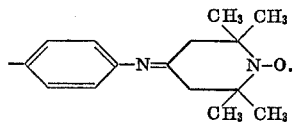

or the group

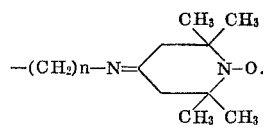

in which $n$ is an integer of 1-8 inclusive.

6. Polyethylene stabilized against deterioration by light wherein there is incorporated an amount of 0.05-2% by weight of a compound selected from the group consisting of 2,2,6,6-tetramethyl-4-n-butylimino-piperidine-1-oxide;
2,2,6,6-tetramethyl-4-cyclohexylimino-piperidine-1-oxide;
2,2,6,6-tetramethyl-4-ureidoimino-piperidine-1-oxide;
2,2,6,6-tetramethyl-4-(p-tolylimino)-piperidine-1-oxide;
2,2,6,6-tetramethyl-4-(p-tolylhydrazono)-piperidine-1-oxide;
N,N'-bis(2,2,6,6-tetramethyl-4-piperidylidene-1-oxide) ethylenediamine;
N,N'-bis(2,2,6,6-tetramethyl-4-piperidylidene-1-oxide) hexamethylenediamine; and
N,N'-bis(2,2,6,6-tetramethyl-4-piperidylidene-1-oxide) p-phenylenediamine.

References Cited

UNITED STATES PATENTS 3,334,103  8/1967  Feldman et al. _____ 260—290
3,361,707  1/1968  Newland _____ 260—45.8 XR DONALD E. CZEJA, *Primary Examiner.*

M. J. WELSH, *Assistant Examiner.*

U.S. Cl. X.R.

260—294.7